(12) United States Patent
Wang et al.

(10) Patent No.: US 8,824,129 B2
(45) Date of Patent: Sep. 2, 2014

(54) FRAME ASSEMBLY FOR INSTALLING PANEL MODULES WITH DIFFERENT DIMENSIONS AND PANEL DEVICE THEREWITH

(75) Inventors: Chih-Yi Wang, New Taipei (TW); Ying-Chen Lin, New Taipei (TW); Yu-Chi Chung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 296 days.

(21) Appl. No.: 13/444,832

(22) Filed: Apr. 11, 2012

(65) Prior Publication Data

US 2013/0070407 A1 Mar. 21, 2013

(30) Foreign Application Priority Data

Sep. 16, 2011 (TW) .............................. 100217420 U

(51) Int. Cl.
*G06F 1/16* (2006.01)
*G02F 1/1333* (2006.01)

(52) U.S. Cl.
CPC .. *G06F 1/1637* (2013.01); *G02F 2001/133328* (2013.01); *Y10S 248/917* (2013.01)
USPC .......................... 361/679.27; 349/58; 248/917

(58) Field of Classification Search
CPC .......................... G02F 1/133308; G06F 1/1637
USPC ............. 361/679.21, 679.26, 679.27; 349/58; 248/917
See application file for complete search history.

(56) References Cited

U.S. PATENT DOCUMENTS

| | | | | |
|---|---|---|---|---|
| 5,946,061 A * | 8/1999 | Kurihara et al. | ................. | 349/58 |
| 6,402,111 B1 * | 6/2002 | Stewart et al. | ................ | 248/317 |
| 6,411,501 B1 * | 6/2002 | Cho et al. | ................. | 361/679.27 |
| 6,688,576 B2 * | 2/2004 | Oishi et al. | ..................... | 248/317 |
| 6,859,357 B2 * | 2/2005 | Morimoto et al. | ........ | 361/679.55 |
| 6,985,356 B2 * | 1/2006 | Wang | ........................ | 361/679.06 |
| 7,006,169 B2 * | 2/2006 | Liu | ................................ | 349/58 |
| 7,075,783 B2 * | 7/2006 | Jeong et al. | ............. | 361/679.21 |
| 7,545,629 B1 * | 6/2009 | Bauer et al. | ............. | 361/679.27 |
| 7,679,894 B2 * | 3/2010 | Yue et al. | ................. | 361/679.26 |
| 7,918,428 B2 * | 4/2011 | Kim et al. | ................ | 248/295.11 |
| 8,276,864 B2 * | 10/2012 | Ye et al. | ...................... | 248/287.1 |
| 2006/0055839 A1* | 3/2006 | Hirao et al. | ...................... | 349/58 |
| 2006/0261226 A1* | 11/2006 | Petrick et al. | .............. | 248/274.1 |
| 2008/0024695 A1* | 1/2008 | Yan | ................................ | 349/58 |
| 2010/0067185 A1* | 3/2010 | Liou | ........................ | 361/679.21 |
| 2011/0128696 A1* | 6/2011 | Weng | ........................ | 361/679.35 |

* cited by examiner

*Primary Examiner* — Adrian S Wilson
(74) *Attorney, Agent, or Firm* — Winston Hsu; Scott Margo

(57) ABSTRACT

A frame assembly for installing panel modules with different dimensions is disclosed. The frame assembly includes a first frame and a second frame. The first frame has a first fixing structure formed thereon and a first sliding structure in an axis direction. The second frame has a second fixing structure formed thereon and a second sliding structure in the axis direction. The second sliding structure is slidably engaged with the first sliding structure. The first fixing structure and the second fixing structure are fixed on a side of a first panel module or on a side of a second panel module when the second frame slides relative to the first frame in the axis direction to a first position or to a second position.

18 Claims, 8 Drawing Sheets

FRAME ASSEMBLY FOR INSTALLING PANEL MODULES WITH DIFFERENT DIMENSIONS AND PANEL DEVICE THEREWITH

BACKGROUND OF THE INVENTION

1. Field of the Invention

The present invention relates to a frame assembly and a panel device therewith, and more particularly, to a frame assembly for installing panel modules with different dimensions and a panel device therewith.

2. Description of the Prior Art

Generally speaking, a frame assembly is installed on lateral sides of a liquid crystal panel module of a notebook computer for supporting the liquid crystal panel module onto a back plate of the notebook computer. Since there are various notebook computers with different dimensions in the market, the liquid crystal panel modules and the corresponding frame assemblies having various kinds of dimensions are adapted to the notebook computers with different dimensions in the market.

In practical application, it requires different tooling molds to manufacture the frame assemblies with different dimensions, resulting in additional labors to design the tooling molds and delay of product cycle time. In addition, the various tooling molds respectively for the frame assemblies with different dimensions also increase manufacturing cost to be uncompetitive in the market.

SUMMARY OF THE INVENTION

Therefore, the disclosure provides a frame assembly for installing panel modules with different dimensions. The frame assembly includes a first frame and a second frame. A first fixing structure and a first sliding structure in an axis direction are formed on the first frame. A second fixing structure and a second sliding structure in the axis direction are formed on the second frame. The second sliding structure is slidably engaged with the first sliding structure. The first fixing structure and the second fixing structure are for cooperatively fixing a side of a first panel module or a side of a second panel module when the second frame slides relative to the first frame in the axis direction to a first position or to a second position.

Furthermore, the disclosure provides a panel device including a first panel module and a frame assembly. The frame assembly includes a first frame and a second frame. A first fixing structure and a first sliding structure in an axis direction are formed on the first frame. A second fixing structure and a second sliding structure in the axis direction are formed on the second frame. The second sliding structure is slidably engaged with the first sliding structure. The first fixing structure and the second fixing structure are for cooperatively fixing a side of the first panel module when the second frame slides relative to the first frame in the axis direction to a first position. The first fixing structure and the second fixing structure are further for cooperatively fixing a side of a second panel module with a dimension different from a dimension of the first panel module when the second frame slides relative to the first frame in the axis direction to a second position.

These and other objectives of the present invention will no doubt become obvious to those of ordinary skill in the art after reading the following detailed description of the embodiment that is illustrated in the various figures and drawings.

DETAILED DESCRIPTION

Figure 1:
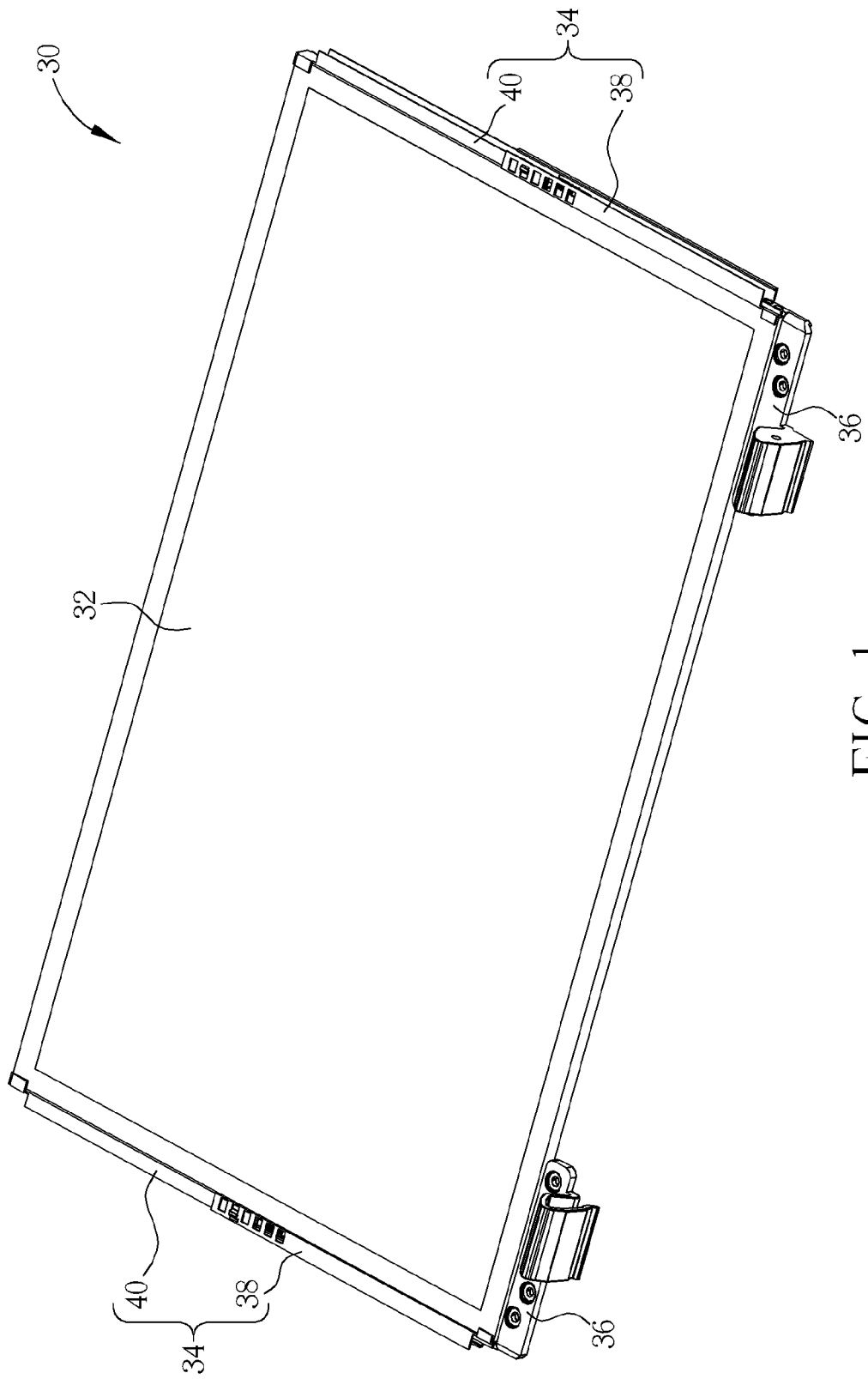
FIG. 1 is a diagram of a panel device according to an embodiment of the disclosure.
Figure 2:
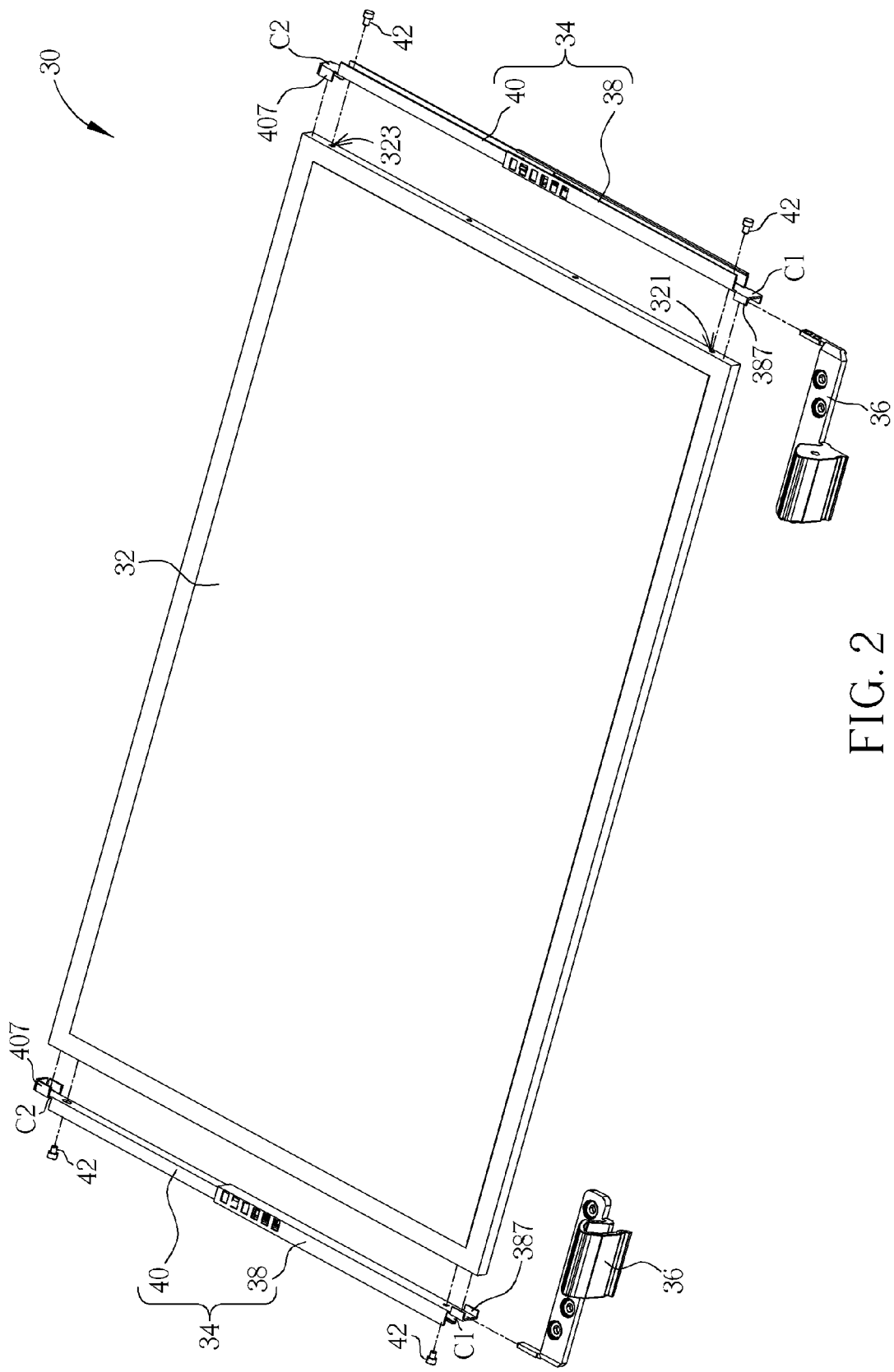
FIG. 2 is an exploded diagram of the panel device according to the embodiment of the disclosure.

Please refer to FIG. 1 and FIG. 2. FIG. 1 is a diagram of a panel device 30 according to an embodiment of the disclosure. FIG. 2 is an exploded diagram of the panel device 30 according to the embodiment of the disclosure. As shown in FIG. 1 and FIG. 2, the panel device 30 includes a first panel module 32 and at least one frame assembly 34. The frame assembly 34 is fixed on a side of the first panel module 32, so as to install the first panel module 32 onto a back plate (not shown in figures) of the panel device 30. In this embodiment, the panel device 30 can be a liquid crystal panel device of a notebook computer, and the first panel module 32 can be a liquid crystal panel. In practical application, there are two frame assemblies 34 respectively disposed on a left side and a right side of the first panel module 32, so as to strengthen supporting for the first panel module 32 as the first panel module 32 is installed onto the back plate of the panel device 30.

In addition, the panel device 30 can further include a pivoting member 36, and the frame assembly 34 includes a first frame 38 and a second frame 40. The pivoting member 36 is pivoted to an end of the first frame 38 far from the second frame 40. In this embodiment, the pivoting member 36 is used for pivoting the panel device 30 and a host (not shown in figures) of the notebook computer. In such a manner, the panel device 30 can pivot relative to the host of the notebook computer by the pivoting member 36. Accordingly, the panel device 30 can be opened relative to the host for a user to operate the notebook computer. Alternatively, the panel device 30 can be closed relative to the host for the user to carry. In practical application, the pivoting member 36 can be, but not limited to, connected to the first frame 38 in a riveting manner. For example, the pivoting member 36 can be connected to the first frame 38 in a structural engagement manner as well. In other words, structures capable of connecting the pivoting member 36 and the first frame 38 are within the scope of the disclosure.

Figure 3:
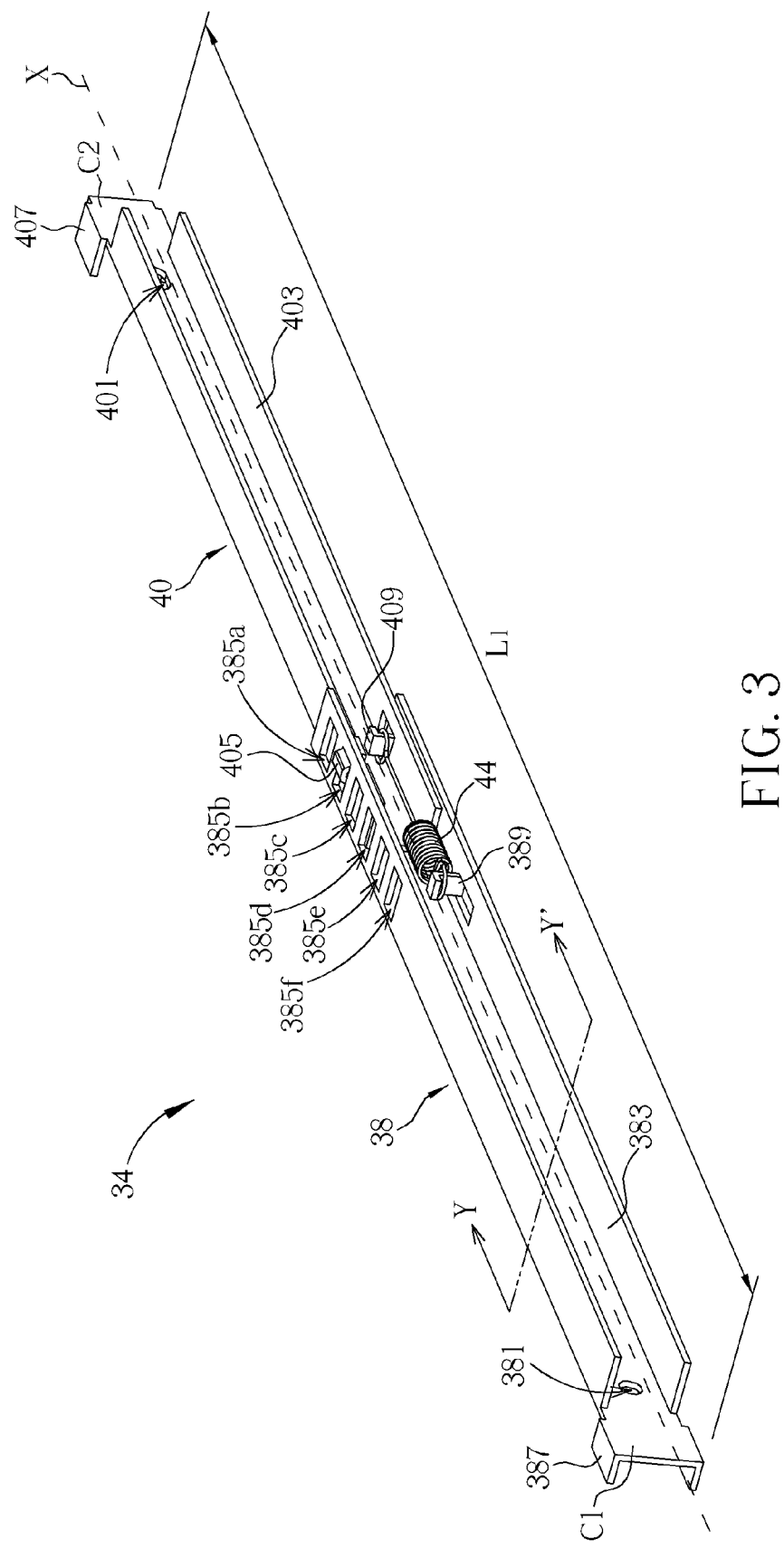
FIG. 3 is a diagram of a frame assembly in a first status according to the embodiment of the disclosure.

Please refer to FIG. 2 and FIG. 3. FIG. 3 is a diagram of the frame assembly 34 in a first status according to the embodiment of the disclosure. As shown in FIG. 2 and FIG. 3, a first fixing structure 381 and a first sliding structure 383 in an axis direction X are formed on the first frame 38 of the frame assembly 34. A second fixing structure 401 and a second sliding structure 403 in the axis direction X are formed on the second frame 40 of the frame assembly 34. The second sliding structure 403 is slidably engaged with the first sliding structure 383, such that the second frame 40 slides relative to the first frame 38 in the axis direction X. In this embodiment, the axis direction X can be parallel to a longitudinal direction of the first frame 38 and the second frame 40. As a result, a length of the frame assembly 34 can be adjusted since the first frame 38 is capable of sliding relative to the second frame 40.

In addition, the panel device 30 further includes a plurality of fastening components 42. The fastening components 42 are respectively corresponding to the first fixing structure 381 of the first frame 38 and to the second fixing structure 401 of the second frame 40. Furthermore, the first panel module 32 has a first screw hole 321 and a second screw hole 323. In this embodiment, the first fixing structure 381 can be a first through hole, and the second fixing structure 401 can be a second through hole. The first through hole and the second through hole correspond to the first screw hole 321 and the second screw hole 323, respectively. In practical application, the fastening components 42 are preferably screw components for respectively passing through the first fixing structure 381 and the second fixing structure 401 and for screwing into the first screw hole 321 and the second screw hole 323.

In addition, a plurality of positioning slots 358a-385f are formed on the first frame 38, the second frame 40 further includes a positioning hook 405. When the second frame 40 slides relative to the first frame 38 in the axis direction X to a first position shown in FIG. 3, the positioning hook 405 of the second frame 40 engages with the positioning slot 358b. In the meanwhile, the frame assembly 34 has a first length L1, and the first length L1 is equal to a length of a lateral side of the first panel module 32. Accordingly, the frame assembly 34 can be installed to a side of the first panel module 32, and the first through hole of the first frame 38 and the second through hole of the second frame 40 can be aligned with and attached to the first screw hole 321 and the second screw hole 323 of the first panel module 32, respectively. In such a manner, the fastening components 42 can respectively pass through the first through hole and be screwed onto the first screw hole 321 and can respectively pass through the second through hole and be screwed onto the second screw hole 323. Accordingly, the first frame 38 and the second frame 40 of the frame assembly 34 can be fixed on the side of the first panel module 32.

In addition, a first clamping portion 387 is disposed on a corner C1 of the first frame 38, and a second clamping portion 407 is disposed on a corner C2 of the second frame 40 far from the first frame 38. When the frame assembly 34 is installed on the side of the first panel module 32, the first clamping portion 387 and the second clamping portion 407 are respectively used for clamping the corners of the first panel module 32, so as to strengthen supporting of the first frame 38 and the second frame 40 of the frame assembly 34 for the first panel module 32. In such a manner, the first panel module 32 can be fixed on the back plate of the panel device 30 by the frame assembly 34 more stably.

Figure 4:
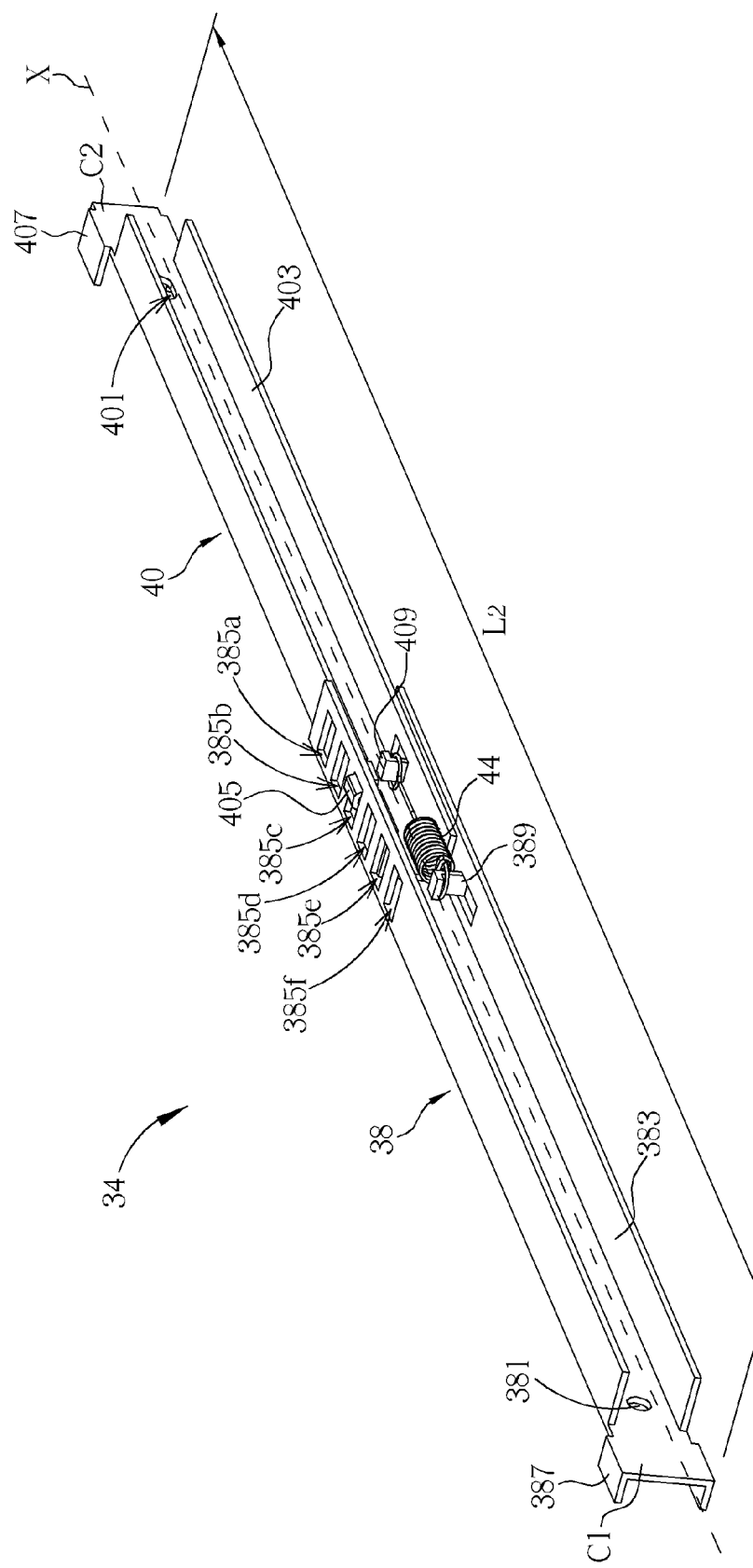
FIG. 4 is a diagram of the frame assembly in a second status according to the embodiment of the disclosure.

More detailed description for length adjustment of the frame assembly 34 is provided as follows. Please refer to FIG. 3 and FIG. 4. FIG. 4 is a diagram of the frame assembly 34 in a second status according to the embodiment of the disclosure. When the frame assembly 34 of the disclosure is desired to change from the first status shown in FIG. 3 to the second status shown in FIG. 4, it only needs to press the positioning hook 405 of the second frame 40 in FIG. 3 to deform the positioning hook 405. Accordingly, the positioning hook 405 separates from the positioning slot 358b. In the meanwhile, the second frame 40 can slide relative to the first frame 38 in the axis direction X. When the second frame 40 slides relative to the first frame 38 to a second position as shown in FIG. 4, the positioning hook 405 of the second frame 40 is capable of engaging with the positioning slot 358c due to resilient force thereof. Accordingly, a relative position between the first frame 38 and the second frame 40 is fixed, and the frame assembly 34 has a second length L2. Furthermore, the second length L2 can be equal to a lateral side of a second panel module with different dimensions from the first panel module 32. Accordingly, the frame assembly 34 can be installed on a side of the second panel module with different dimensions. Then, the fastening components 42, the first through hole of the first frame 38, the second through hole of the second frame 40 and corresponding screw bosses on the second panel module can be utilized for fixing the first frame 38 and the second frame 40 of the frame assembly 34 onto the side of the second panel module.

In summary, the frame assembly 34 of the disclosure utilizes the second frame 40 to slide relative to the first frame 38 in the axis direction X, and then utilizes the first fixing structure 381 of the first frame 38 and the second fixing structure 401 of the second frame 40 to cooperatively fix the first frame 38 and the second frame 40 on the side of the first panel module 32 or on the side of the second panel module with different dimensions from the first panel module 32 when the second frame 40 slides relative to the first frame 38 in the axis direction X to the first position or to the second position. In such a manner, the frame assembly 34 of the disclosure can be utilized for selectively installing on the first panel module 32 or the second panel module with different dimensions.

It should be noticed that an amount of panel modules to which the frame assembly 34 of the disclosure is adapted is not limited to that mentioned in the aforesaid embodiment. As known above, when the second frame 40 slides relative to the first frame 38 in the axis direction X to an engaging position, the positioning hook 405 of the second frame 40 can be used for engaging with one of the positioning slots 358a-385f. Accordingly, the frame assembly 34 of the disclosure can be adjusted by the positioning slots 358a-385f. In this embodiment, the first frame 38 can include six positioning slots 358a-385f, that is, the frame assembly 34 of the disclosure can have six kinds of length. Accordingly, the frame assembly 34 of the disclosure can be adapted to six kinds of panel modules with different dimensions. The amount of the positioning slots is not limited to that mentioned in the aforesaid embodiment, and it depends on practical application.

Figure 5:
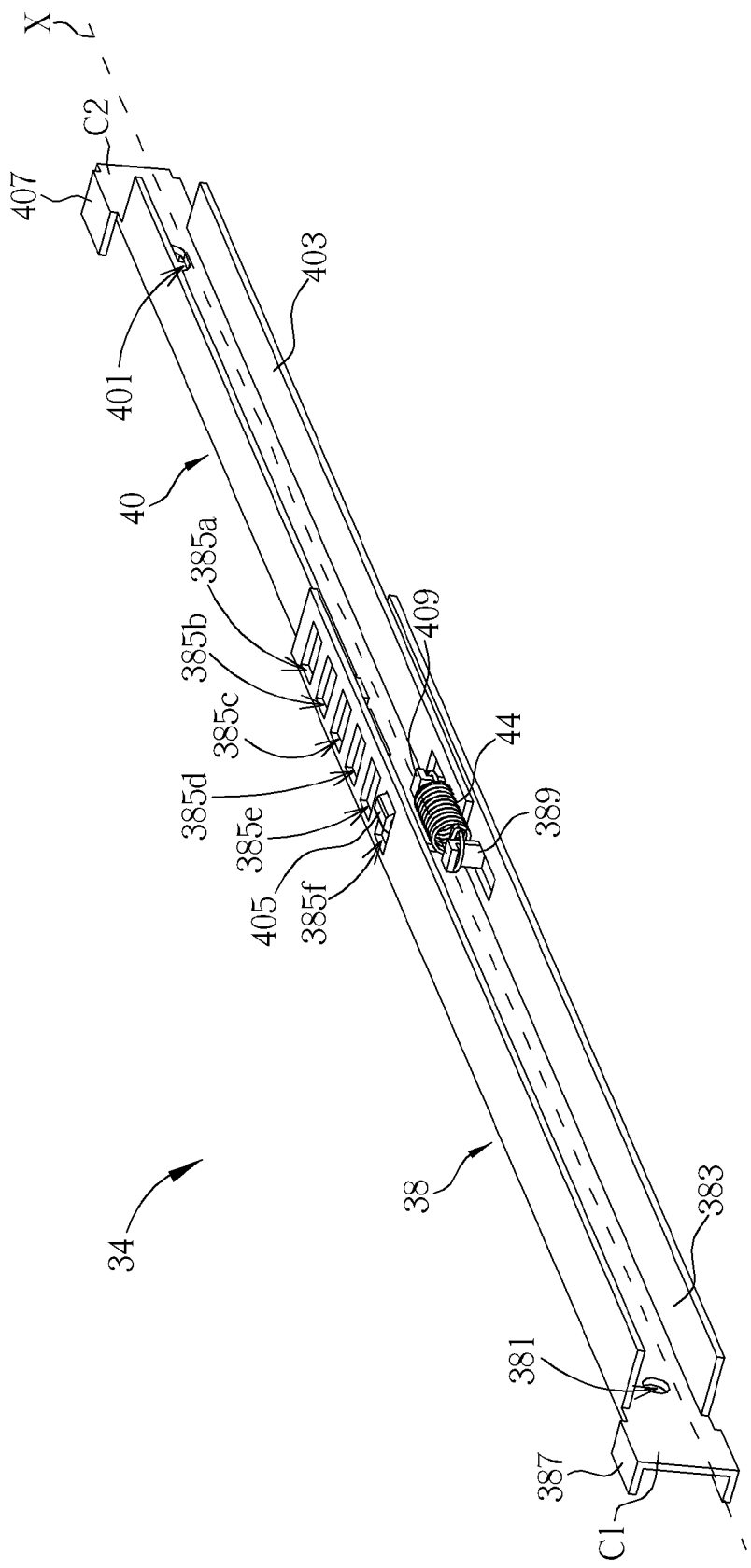
FIG. 5 is a diagram of the frame assembly in a contained status according to the embodiment of the disclosure.

In addition, the frame assembly 34 of the disclosure further includes a resilient member 44, the first frame 38 has a first bending structure 389, and the second frame 40 has a second bending structure 409. Both ends of the resilient member 44 are connected to the first bending structure 389 of the first frame 38 and second bending structure 409 of the second frame 40. Please refer to FIG. 5. FIG. 5 is a diagram of the frame assembly 34 in a contained status according to the embodiment of the disclosure. When the second frame 40 slides relative to the first frame 38 in the axis direction X, the first bending structure 389 and the second bending structure 409 cooperatively stretch the resilient member 44. Then, when the positioning hook 405 of the second frame 40 engages with one of the positioning slots 358a-385f, the resilient member 44 is in an extended status, so as to store resilient potential energy. When the positioning hook 405 is pressed to separate from the positioning slots 358a-385f, the resilient member 44 releases the resilient potential energy, so as to drive the second frame 40 to slide relative to the first frame 38 in the axis direction X to a contained position as shown in FIG. 5. Accordingly, the positioning hook 405 of the second frame 40 is capable of engaging with the positioning slot 358f, so as to fix the frame assembly 34 in the contained position.

Figure 6:
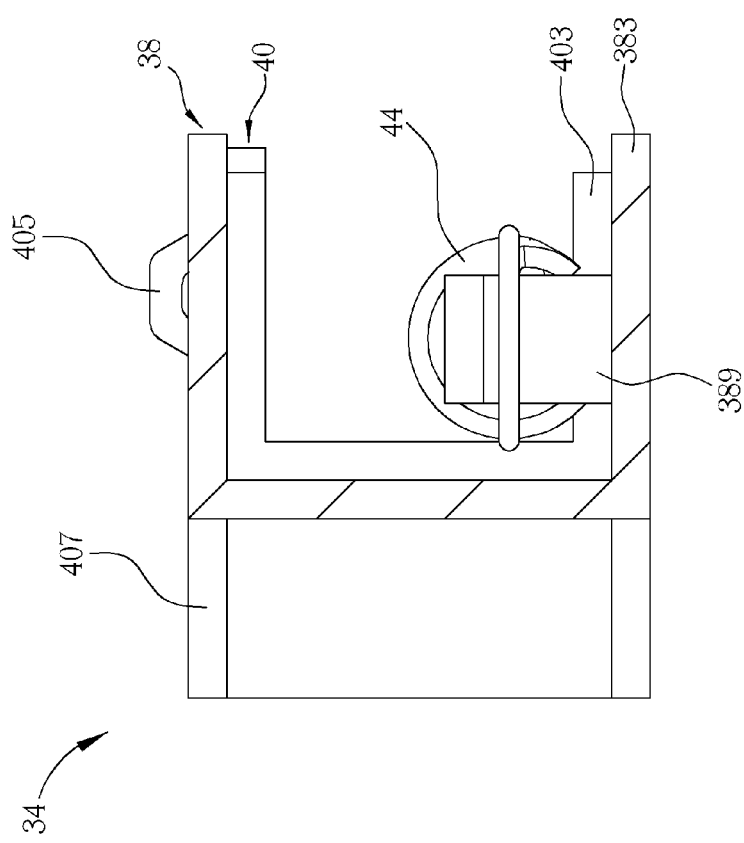
FIG. 6 is a sectional diagram of the frame assembly taken along cross-section line Y-Y' in FIG. 3.

Please refer to FIG. 3 and FIG. 6. FIG. 6 is a sectional diagram of the frame assembly 34 taken along cross-section line Y-Y' in FIG. 3. As shown in FIG. 3 and FIG. 6, a cross section of the first frame 38 and a cross section of the second frame 40 of the frame assembly are substantially C-shaped, respectively. The first sliding structure 383 of the first frame 38 is a C-shaped slot, the second sliding structure 403 of the second frame 40 is a C-shaped track, and a dimension of the C-shaped track is substantially identical to a dimension of the C-shaped slot. In such a manner, the C-shaped track can slide relative to the C-shaped slot, so as to adjust the length of the frame assembly 34.

Figure 7:
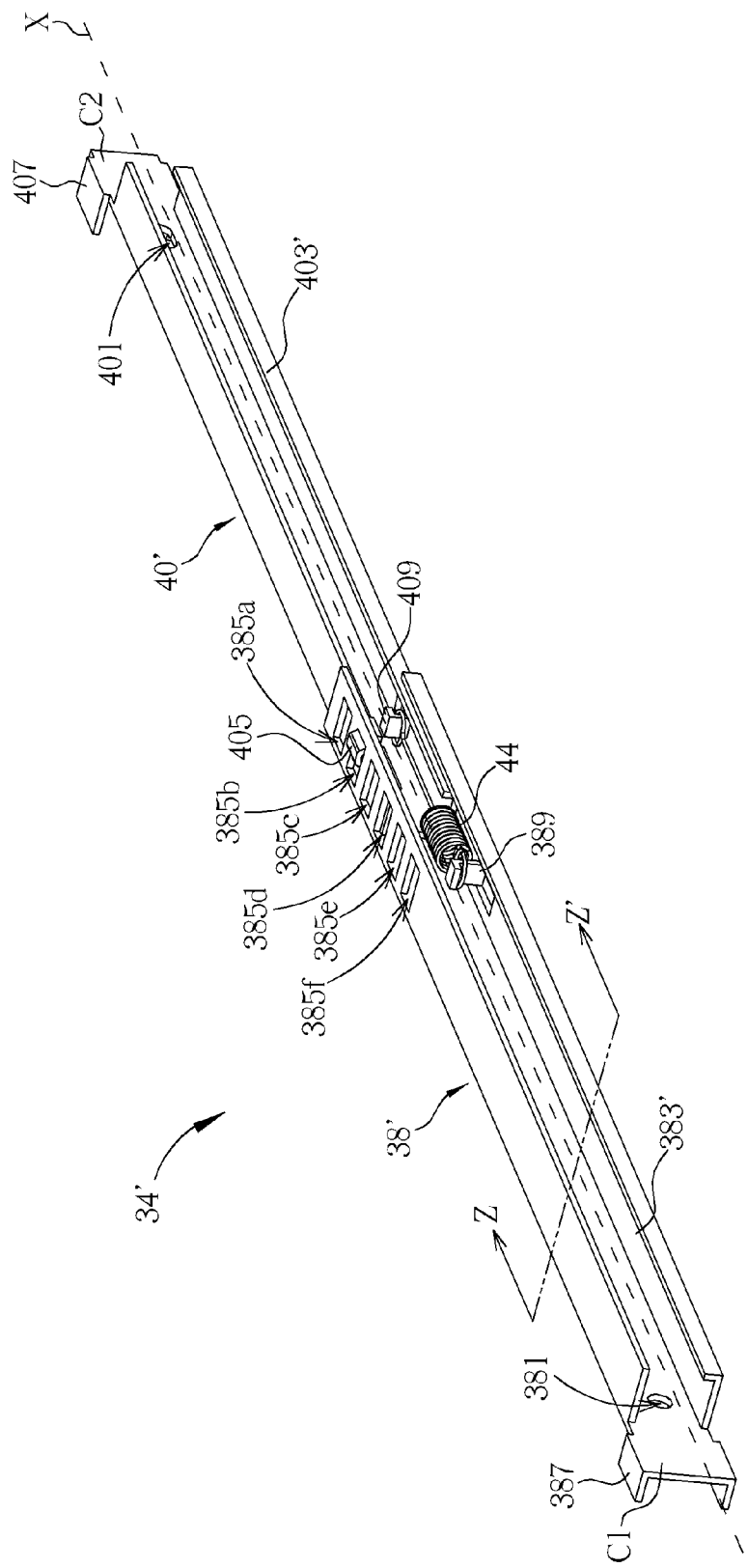
FIG. 7 is a diagram of a frame assembly according to another embodiment of the disclosure.
Figure 8:
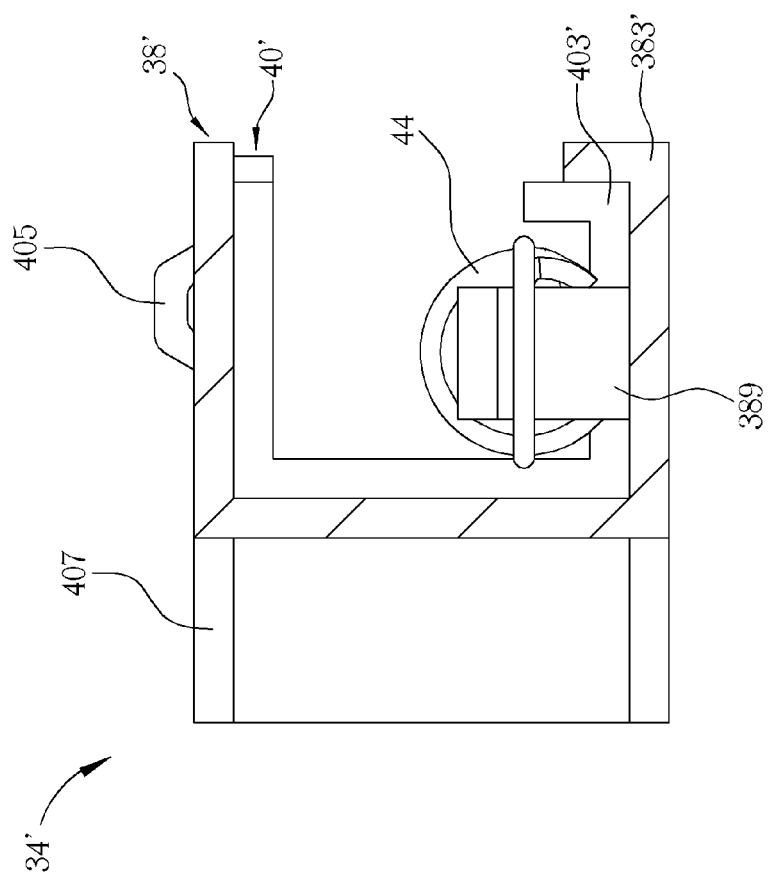
FIG. 8 is a sectional diagram of the frame assembly taken along cross-section line Z-Z' in FIG. 7.

Please refer to FIG. 3 and FIG. 7 and refer to FIG. 6 and FIG. 8. FIG. 7 is a diagram of a frame assembly 34' according to another embodiment of the disclosure. FIG. 8 is a sectional diagram of the frame assembly 34' taken along cross-section line Z-Z' in FIG. 7. As shown in FIG. 3 and FIG. 7 and as shown in FIG. 6 and FIG. 8, the main difference between the frame assembly 34' and the aforesaid frame assembly 34 is a cross section of a first frame 38' and a cross section of a second frame 40' of the frame assembly 34' are substantially G-shaped, respectively. The first sliding structure 383' of the first frame 38' is a G-shaped slot, the second sliding structure 403' of the second frame 40' is a G-shaped track, and a dimension of the G-shaped track is substantially identical to a dimension of the G-shaped slot. In such a manner, the G-shaped track can slide relative to the G-shaped slot, so as to adjust the length of the frame assembly 34'. Components with the same denotes in FIG. 3 and FIG. 7 and in FIG. 6 and FIG. 8 have the same structures and functions, so further description is omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame assembly for installing panel modules with different dimensions, the frame assembly comprising:
   a first frame whereon a first fixing structure and a first sliding structure in an axis direction are formed;
   a second frame whereon a second fixing structure and a second sliding structure in the axis direction are formed, the second sliding structure being slidably engaged with the first sliding structure, the first fixing structure and the second fixing structure being for cooperatively fixing a side of a first panel module or a side of a second panel module when the second frame slides relative to the first frame in the axis direction to a first position or to a second position; and
   a resilient member with both ends respectively connected to the first frame and the second frame for driving the second frame to slide relative to the first frame in the axis direction to a contained position.

2. The frame assembly of claim 1, wherein a plurality of positioning slots is formed on the first frame, and the second frame comprises a positioning hook for selectively engaging with one of the plurality of positioning slots when the second frame slides relative to the first frame in the axis direction to an engaging position.

3. The frame assembly of claim 2, further comprising a resilient member with both ends respectively connected to the first frame and the second frame for driving the second frame to slide relative to the first frame in the axis direction to a contained position.

4. The frame assembly of claim 3, wherein a first clamping portion is disposed on a corner of the first frame, a second clamping portion is disposed on a corner of the second frame far from the corner of the first frame, and the first clamping portion and the second clamping portion are respectively for clamping the first panel module.

5. The frame assembly of claim 4, wherein a cross section of the first frame and a cross section of the second frame are respectively C-shaped, the first sliding structure is a C-shaped slot, the second sliding structure is a C-shaped track, and a dimension of the C-shaped track is substantially identical to a dimension of the C-shaped slot.

6. The frame assembly of claim 4, wherein a cross sections of the first frame and a cross section of the second frame are respectively G-shaped, the first sliding structure is a G-shaped slot, the second sliding structure is a G-shaped track, and a dimension of the G-shaped track is substantially identical to a dimension of the G-shaped slot.

7. The frame assembly of claim 1, wherein a first clamping portion is disposed on a corner of the first frame, a second clamping portion is disposed on a corner of the second frame far from the corner of the first frame, and the first clamping portion and the second clamping portion are respectively for clamping the first panel module.

8. The frame assembly of claim 7, wherein a cross section of the first frame and a cross section of the second frame are respectively C-shaped, the first sliding structure is a C-shaped slot, the second sliding structure is a C-shaped track, and a dimension of the C-shaped track is substantially identical to a dimension of the C-shaped slot.

9. The frame assembly of claim 7, wherein a cross section of the first frame and a cross section of the second frame are respectively G-shaped, the first sliding structure is a G-shaped slot, the second sliding structure is a G-shaped track, and a dimension of the G-shaped track is substantially identical to a dimension of the G-shaped slot.

10. The frame assembly of claim 1, wherein a first clamping portion is disposed on a corner of the first frame, a second clamping portion is disposed on a corner of the second frame far from the corner of the first frame, and the first clamping portion and the second clamping portion are respectively for clamping the first panel module.

11. The frame assembly of claim 10, wherein a cross section of the first frame and a cross section of the second frame are respectively C-shaped, the first sliding structure is a C-shaped slot, the second sliding structure is a C-shaped track, and a dimension of the C-shaped track is substantially identical to a dimension of the C-shaped slot.

12. The frame assembly of claim 10, wherein a cross section of the first frame and a cross section of the second frame are respectively G-shaped, the first sliding structure is a G-shaped slot, the second sliding structure is a G-shaped track, and a dimension of the G-shaped track is substantially identical to a dimension of the G-shaped slot.

13. A panel device, comprising:
   a first panel module; and
   a frame assembly comprising:
      a first frame whereon a first fixing structure and a first sliding structure in an axis direction are formed;
      a second frame whereon a second fixing structure and a second sliding structure in the axis direction are formed, the second sliding structure being slidably engaged with the first sliding structure, the first fixing structure and the second fixing structure being for cooperatively fixing a side of the first panel module when the second frame slides relative to the first frame in the axis direction to a first position, and the first fixing structure and the second fixing structure being further for cooperatively fixing a side of a second panel module with a dimension different from a dimension of the first panel module when the second frame slides relative to the first frame in the axis direction to a second position; and a resilient member with both ends respectively connected to the first frame and the second frame for driving the second frame to slide relative to the first frame in the axis direction to a contained position.

14. The panel device of claim 13, wherein a plurality of positioning slots is formed on the first frame, the second frame comprises a positioning hook for selectively engaging with one of the plurality of positioning slots when the second frame slides relative to the first frame in the axis direction to an engaging position, a first clamping portion is disposed on a corner of the first frame, a second clamping portion is disposed on a corner of the second frame far from the corner of the first frame, and the first clamping portion and the second clamping portion are respectively for clamping the first panel module.

15. The panel device of claim 14, wherein a cross section of the first frame and a cross sections of the second frame are respectively C-shaped, the first sliding structure is a C-shaped slot, the second sliding structure is a C-shaped track, and a dimension of the C-shaped track is substantially identical to a dimension of the C-shaped slot.

16. The panel device of claim 14, wherein a cross section of the first frame and a cross sections of the second frame are respectively G-shaped, the first sliding structure is a G-shaped slot, the second sliding structure is a G-shaped track, and a dimension of the G-shaped track is substantially identical to a dimension of the G-shaped slot.

17. The panel device of claim 13, wherein a first clamping portion is disposed on a corner of the first frame, a second clamping portion is disposed on a corner of the second frame far from the corner of the first frame, and the first clamping portion and the second clamping portion are respectively for clamping the first panel module.

18. The panel device of claim 13, wherein a first clamping portion is disposed on a corner of the first frame, a second clamping portion is disposed on a corner of the second frame far from the corner of the first frame, and the first clamping portion and the second clamping portion are respectively for clamping the first panel module.

* * * * *